(12) United States Patent
Nam

(10) Patent No.: US 8,039,164 B2
(45) Date of Patent: Oct. 18, 2011

(54) POLYMER MEMBRANE, MEMBRANE-ELECTRODE ASSEMBLY FOR FUEL CELL, AND FUEL CELL SYSTEM INCLUDING SAME

(75) Inventor: Kie Hyun Nam, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1188 days.

(21) Appl. No.: 11/798,613

(22) Filed: May 15, 2007

(65) Prior Publication Data

US 2008/0076000 A1    Mar. 27, 2008

(30) Foreign Application Priority Data

May 15, 2006   (KR) .................. 10-2006-0043378

(51) Int. Cl.
*H01M 8/10* (2006.01)

(52) U.S. Cl. ......................................................... 429/491
(58) Field of Classification Search .................. None
See application file for complete search history.

(56) References Cited

U.S. PATENT DOCUMENTS

| 4,298,668 A | 11/1981 | Schmidt |
| 5,585,039 A * | 12/1996 | Matsumoto et al. .......... 252/500 |
| 2006/0141315 A1 * | 6/2006 | Murata et al. ................... 429/33 |

FOREIGN PATENT DOCUMENTS

| EP | 0617500 | 9/1994 |
| JP | 2003059507 | 2/2003 |
| JP | 2005-060668 | 3/2005 |
| KR | 10-2006-0122199 | 11/2006 |

* cited by examiner

*Primary Examiner* — Barbara Gilliam
*Assistant Examiner* — Stephan Essex
(74) *Attorney, Agent, or Firm* — Robert E. Bushnell, Esq.

(57) ABSTRACT

The polymer electrolyte membrane for a fuel cell includes a hydrophilically surface-treated polymer particle filler, and a proton conductive polymer. The polymer electrolyte membrane has improved properties in conductivity, swelling, tensile strength and modulus.

24 Claims, 4 Drawing Sheets

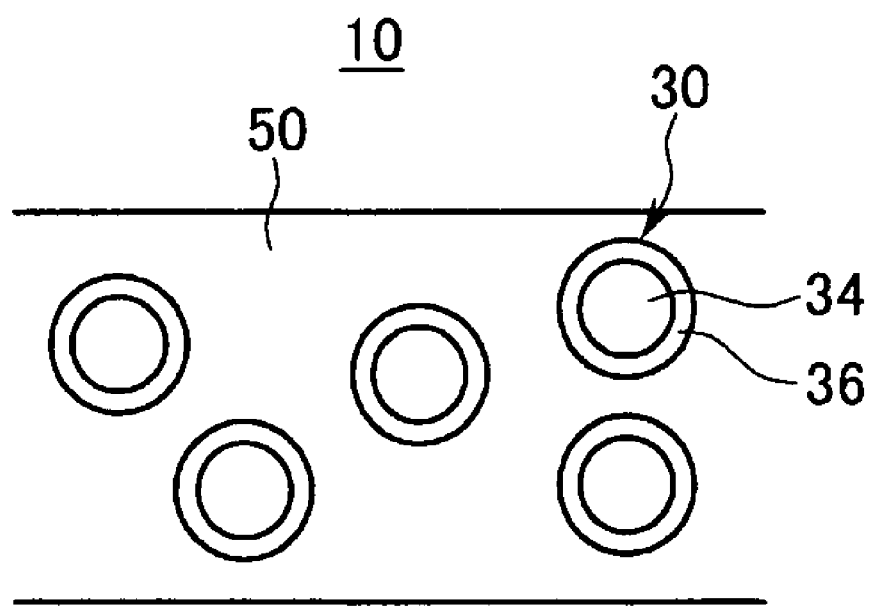

POLYMER MEMBRANE, MEMBRANE-ELECTRODE ASSEMBLY FOR FUEL CELL, AND FUEL CELL SYSTEM INCLUDING SAME

CROSS-REFERENCE TO RELATED APPLICATION AND CLAIM OF PRIORITY

This application claims priority to and the benefit of Korean Patent Application No. 10-2006-0043378 filed in the Korean Intellectual Property Office on May 15, 2006, the entire content of which is incorporated herein by reference.

BACKGROUND OF THE INVENTION (a) Field of the Invention

The present invention relates to a polymer electrolyte membrane for a fuel cell, and a membrane-electrode assembly and a fuel cell system including the same.

(b) Description of the Related Art

A fuel cell is a power generation system for producing electrical energy through an electrochemical redox reaction of an oxidant and hydrogen in a hydrocarbon-based material such as methanol, ethanol, or natural gas.

Such a fuel cell is a clean energy source that can replace fossil fuels. It includes a stack composed of unit cells, and produces various ranges of power output. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte membrane fuel cell has an advantage of high energy density and high power, but it also has problems in the need to carefully handle hydrogen gas and the requirement for additional devices such as a fuel reforming processor for reforming methane or methanol, natural gas, and the like in order to produce hydrogen as the fuel gas.

On the contrary, a direct oxidation fuel cell has lower energy density than that of the polymer electrolyte fuel cell, but has the advantages of easy handling of the polymer electrolyte membrane fuel cell, a low operation temperature, and no need for additional fuel reforming processors.

In the above-mentioned fuel cell system, a stack that generates electricity substantially includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on catalysts of the anode, and the fuel is oxidized to produce protons and electrons. The electrons are transferred into a cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

SUMMARY OF THE INVENTION

One embodiment of the present invention provides an improved polymer electrolyte membrane.

Another embodiment of the present invention provides a membrane-electrode assembly for a fuel cell including the polymer electrolyte membrane.

Yet another embodiment of the present invention provides a fuel cell system including the membrane-electrode assembly.

According to one embodiment of the present invention, a polymer electrolyte membrane for a fuel cell that includes a filler comprised of a hydrophilically surface-treated polymer particle and a proton conductive polymer is provided.

The polymer may be a cross-linked polymer which includes at least one selected from the group consisting of polystyrene, polysulfone, polyvinylpyridine, —($CH_2$ $CHC_6H_4SO_3H)_n$— wherein n ranges from 10 to 10,000, and copolymers thereof.

The filler includes a hydrophilic functional group at its surface. The filler includes a core including the cross-linked polymer and a shell including a hydrophilic polymer disposed on the surface of the core.

The filler has an average particle diameter ranging from 5 nm to 50 μm. According to one embodiment, the filler has an average particle diameter ranging from 10 nm to 10 μm.

The filler is included in an amount of 0.1 to 50 wt % based on the total weight of the polymer electrolyte membrane. According to one embodiment, the filler is included in an amount of 1 to 10 wt % based on the total weight of the polymer electrolyte membrane.

The proton conductive polymer has a cation exchange group selected from the group consisting of a sulfonic acid group, a carboxylic acid group, a phosphoric acid group, a phosphonic acid group, and derivatives thereof, at its side chain.

According to one embodiment of the present invention, a polymer electrolyte membrane that includes a filler comprised of a hydrophilically surface-treated polymer particle and a proton conductive polymer is provided. The filler including a cross-linked polymer particle is comprised of at least one selected from the group consisting of polystyrene, polysulfone, polyvinylpyridine, —($CH_2CHC_6H_4SO_3H)_n$— wherein n ranges from 10 to 10,000, and copolymers thereof, the cross-linked polymer having a hydrophilic functional group at its surface or a shell composed of a hydrophilic polymer on the cross-linked polymer and a proton conductive polymer.

The cross-linked polymer may have the hydrophilic functional group selected from the group consisting of —$(CH_2)_4$ $SO_3H$, —$CF_2CF_2SO_3H$, or a sulfone imide bound to its surface. The cross-linked polymer may have the shell composed of polyvinyl alcohol.

According to another embodiment of the present invention, a membrane-electrode assembly for a fuel cell including an anode and a cathode facing each other and the polymer electrolyte membrane interposed therebetween is provided.

According to yet another embodiment of the present invention, a fuel cell system including an electricity generating element, which includes the membrane-electrode assembly and a separator positioned at each side of the membrane-electrode assembly, a fuel supplier that supplies the electricity generating element with a fuel, and an oxidant supplier that supplies the electricity generating element with an oxidant, is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1B schematically shows the structure of a polymer electrolyte membrane according to one embodiment of the present invention;

DETAILED DESCRIPTION OF THE EMBODIMENTS

An exemplary embodiment of the present invention will hereinafter be described in detail with reference to the accompanying drawings.

A currently used polymer electrolyte membrane such as NAFION has a limit for improvement of fuel cell performance since the membrane has high swelling and fuel crossover when using a mixed fuel of methanol and water, particularly with a high concentration of methanol. A polymer electrolyte membrane is required to have a predetermined mechanical strength and dimensional stability for constituting a stack.

The present invention relates to a polymer electrolyte membrane that can reduce swelling and improve mechanical strength.

Figure 1A:
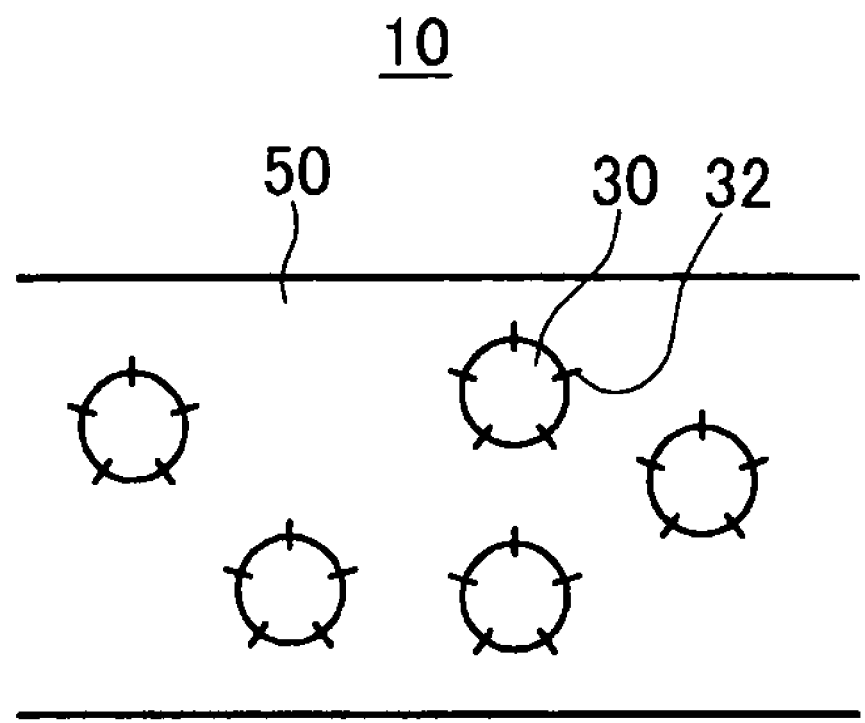
FIG. 1A schematically shows the structure of a polymer electrolyte membrane according to one embodiment of the present invention.

FIGS. 1A and 1B schematically show the structure of a polymer electrolyte membrane according to one embodiment of the present invention. Referring to FIGS. 1A and 1B, the polymer electrolyte membrane 10 includes a filler 30 and a proton conductive polymer 50. The filler 30 may include a hydrophilically surface-treated and cross-linked polymer.

The polymer constituting the filler 30 may be polystyrene, polysulfone, polyvinylpyridine, —(CH$_2$CHC$_6$H$_4$SO$_3$H)$_n$— wherein n ranges from 10 to 10,000, or copolymers thereof.

According to one embodiment, as the polymer constituting the filler 30 is cross-linked, it does not dissolve in a solvent. Thereby, it can protect the particle shape from breakout or deformation caused by dissolving it in a solvent such as water.

Further, although the polymer constituting the filler 30 is a non-ionic conductive polymer, the surface thereof is subjected to a hydrophilic treatment. Therefore, it can increase the ionic conductivity as well as prevent the deterioration of the fuel cell performance which is caused by the non-ionic conductive polymer decreasing ionic conductivity of the electrolyte membrane.

The hydrophilic surface treatment may include sulfonating the particle surface, reacting the particle surface with sulfone, or forming a shell of the core-shell particle using a hydrophilic polymer when the polymer particle is emulsion-polymerized.

The hydrophilically surface-treated filler 30 includes a hydrophilic functional group 32 such as —(CH$_2$)$_4$SO$_3$H, —CF$_2$CF$_2$SO$_3$H, or a sulfone imide bound to its surface. Alternatively, the filler 30 includes a core 34 including a non-ionic conductive polymer and a shell 36 including a hydrophilic polymer disposed on the surface of the core. The hydrophilic polymer may include polyvinyl alcohol and so on.

The filler 30 has an average particle diameter ranging from 5 nm to 50 μm. According to one embodiment, the filler has an average particle diameter ranging from 10 nm to 10 μm. When the filler has an average particle diameter of less than 5 nm, it is difficult to handle and purchase it due to the difficulty of preparing it within this size range. On the other hand, when it is more than 50 μm, it is difficult to uniformly control the mechanical properties thereof.

The filler 30 is included in an amount of 0.1 to 50 wt % based on the total weight of the polymer electrolyte membrane. According to one embodiment, the filler is included in an amount of 1 to 10 wt % based on the total weight of the polymer electrolyte membrane. When the filler is added at less than 0.1 wt %, the effect of adding the filler is insufficient, but when it is more than 50 wt %, the mechanical ionic conductivity is deteriorated.

The proton conductive polymer 50 may be a polymer resin having a cation exchange group such as a sulfonic acid group, a carboxylic acid group, a phosphoric acid group, a phosphonic acid group, and derivatives thereof, at its side chain.

Non-limiting examples of the polymer resin include fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid) (Trade name: NAFION), poly(perfluorocarboxylic acid), a copolymer of tetrafluoroethylene and fluorovinylether having a sulfonic acid group, polyetherketone sulfide, aryl ketone, poly(2,2'-(m-phenylene)-5,5'-bibenzimidazole), and poly(2,5-benzimidazole).

H in a proton conductive group of the proton conductive polymer can be replaced with Na, K, Li, Cs, or tetrabutyl ammonium. When the H is substituted by Na in an ion exchange group at the terminal end of the proton conductive group, NaOH is used. When the H is replaced with tetrabutyl ammonium, tetrabutylammonium hydroxide is used. K, Li, or Cs can also be replaced by using appropriate compounds. Since a method of substituting H is widely known in this related art, a detailed description thereof will not be provided herein.

The polymer electrolyte membrane can be applied to a fuel cell such as a direct oxidation fuel cell.

Figure 2:
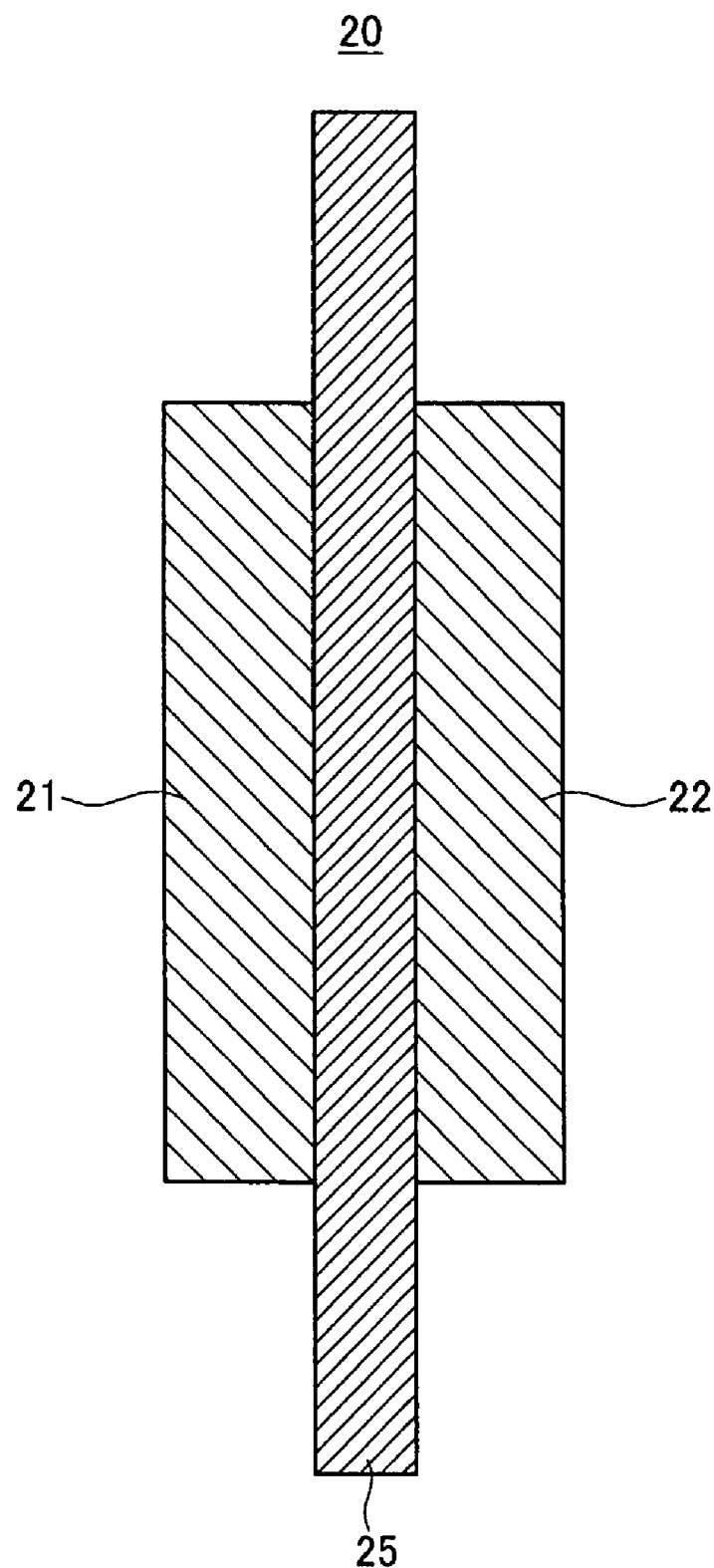
FIG. 2 is a schematic cross-sectional view showing a membrane-electrode assembly according to an embodiment of the present invention.

The membrane-electrode assembly 20 including the above polymer electrolyte membrane is illustrated in FIG. 2. Referring to FIG. 2, an anode 21 and a cathode 22 are disposed at each side of a polymer electrolyte membrane 25.

The cathode and anode each includes an electrode substrate and a catalyst layer.

The catalyst layer includes at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or one supported on a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used.

When the catalyst is a noble metal supported on a carrier, it may include any commercially available one, or be prepared by supporting the noble metal on a carrier. Since the process of supporting the noble metal on a carrier is known to this art, one skilled in the art may easily understand the present invention even though it is omitted from this description.

The catalyst layer includes a binder resin to improve its adherence and proton transfer properties. The binder resin may be a proton conductive polymer resin having a cation exchange group selected from the group consisting of a sulfonic acid group, a carboxylic acid group, a phosphoric acid group, a phosphonic acid group, and derivatives thereof, at its side chain. Non-limiting examples of the proton conductive polymer resin include at least one proton conductive polymer selected from the group consisting of fluoro-based polymers including perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. The H can be replaced with Na, K, Li, Cs, or tetrabutyl ammonium in a proton conductive group of the proton conductive polymer. When the H is replaced with Na in an ion exchange group at the terminal end of the proton conductive group, NaOH is used. When the H is replaced with tetrabutyl ammonium, tetrabutyl ammonium hydroxide is used. K, Li, or Cs can also be replaced by using appropriate compounds. A method of replacing H is known in this related art, and therefore is not described in detail.

The binder resin may be used singularly or as a mixture. Optionally, the binder resin may be used along with a non-conductive polymer to improve adherence between a polymer electrolyte membrane and the catalyst layer. The amount of the binder resin may be adjusted to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinyletherer copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

The electrode substrates support the electrodes, and provide a path for transferring fuel and an oxidant to the catalyst. In one embodiment, the electrode substrates are formed from a material such as carbon paper, carbon cloth, or carbon felt, or a metal cloth that includes a metal film formed on a surface of a porous cloth film or a cloth composed of polymer fibers. The electrode substrates are not limited thereto.

The electrode substrates may include water-repellent fluorine-based resins to prevent deterioration of diffusion efficiency due to the water generated during operation of a fuel cell. The fluorine-based resin may include polytetrafluoroethylene, polyvinylidene fluoride, polyhexafluoropropylene, polyperfluoroalkylvinylether, polyperfluorosulfonylfluoride alkoxy vinyl ether, fluorinated ethylene propylene, polychlorotrifluoroethylene, or fluoroethylene polymers, but is not limited thereto.

A microporous layer (MPL) can be added between the aforementioned electrode substrates and the catalyst layer to increase reactant diffusion effects. The microporous layer generally includes conductive powders with a certain particle diameter. The conductive material may include, but is not limited to, carbon powder, carbon black, acetylene black, activated carbon, carbon fiber, fullerene, nano-carbon, and combinations thereof. The nano-carbon may include a material such as carbon nanotubes, carbon nanofiber, carbon nanowire, carbon nanohorns, carbon nanorings, and combinations thereof.

The microporous layer is formed by coating a composition including a conductive powder, a binder resin, and a solvent on the conductive substrate. The binder resin may include, but is not limited to, polytetrafluoroethylene, polyvinylidene fluoride, polyhexafluoropropylene, polyperfluoro alkylvinyl ether, polyperfluorosulfonylfluoride, alkoxyvinyl ether, polyvinyl alcohol, cellulose acetate, and copolymers thereof. The solvent may include, but is not limited to, an alcohol such as ethanol, isopropylalcohol, n-propylalcohol, butanol, and so on, water, dimethyl acetamide, dimethyl sulfoxide, and N-methylpyrrolidone. The coating method may include, but is not limited to, screen printing, spray coating, doctor blade methods, gravure coating, dip coating, silk screening, painting, and so on, depending on the viscosity of the composition.

The fuel cell system according to one embodiment includes a stack composed of at least one electricity generating element, a fuel supplier, and an oxidant supplier.

The electricity generating element includes a membrane-electrode assembly and separators disposed at each side of the membrane-electrode assembly. It generates electricity through oxidation of a fuel and reduction of an oxidant.

The fuel supplier plays a role of supplying the electricity generating element with fuel including hydrogen, and the oxidant supplier plays a role of supplying the electricity generating element with an oxidant such as oxygen or air.

The fuel includes liquid or gaseous hydrogen, or a hydrocarbon-based fuel such as methanol, ethanol, propanol, butanol, or natural gas. The polymer electrolyte membrane according to one embodiment of the present invention may be suitable for a direct oxidation fuel cell system. Accordingly, a hydrocarbon fuel may be suitable for the direct oxidation fuel cell system including the polymer electrolyte membrane.

Figure 3:
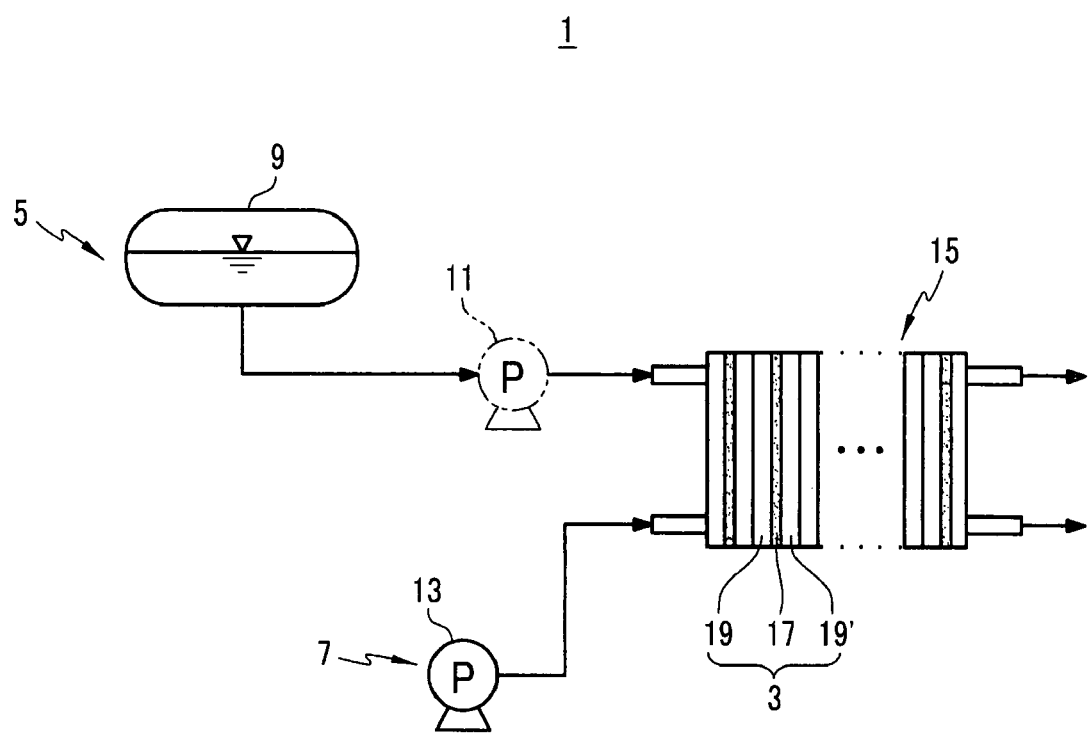
FIG. 3 schematically shows the structure of a fuel cell system according to one embodiment of the present invention.

FIG. 3 shows a schematic structure of a fuel cell system 1 that will be described in detail with reference to the accompanying drawing as follows. FIG. 3 illustrates a fuel cell system 1 wherein a fuel and an oxidant are provided to an electricity generating element 3 through pumps 11 and 13, but the present invention is not limited to this structure. The fuel cell system of the present invention may alternatively include a structure wherein a fuel and an oxidant are provided in a diffusion manner.

The fuel cell system 1 includes at least one electricity generating element 3 that generates electrical energy through an electrochemical reaction of fuel and an oxidant, a fuel supplier 5 for supplying fuel to the electricity generating element 3, and an oxidant supplier 7 for supplying the oxidant to the electricity generating element 3.

In addition, the fuel supplier 5 is equipped with a tank 9, which stores fuel, and a fuel pump 11, which is connected therewith. The fuel pump 11 supplies the fuel stored in the tank 9 with a predetermined pumping power.

The oxidant supplier 7, which supplies the electricity generating element 3 with the oxidant, is equipped with at least one pump 13 for supplying the oxidant with a predetermined pumping power.

The electricity generating element 3 includes a membrane-electrode assembly 17 that oxidizes fuel such as hydrogen and reduces an oxidant, separators 19 and 19' that are respectively positioned at opposite sides of the membrane-electrode assembly 17 and supply fuel such as hydrogen, and an oxidant. At least one electricity generating element 3 is stacked to form a stack 15.

The following examples illustrate the present invention in more detail. However, it is understood that the present invention is not limited by these examples.

Example 1

Spherical cross-linked polystyrene polymer particles having an average particle size of 1 μm were prepared by emulsion-free polymerization. The spherical polystyrene polymer particles were immersed in 100% sulfuric acid for 24 hours to sulfonate the particle surface, and then removed from the sulfuric acid. Then they were washed with water twice and dried to provide a filler including a hydrophilically surface-treated polymer.

The filler was dispersed in dimethylacetamide while agitating for 30 minutes. Then, a NAFION-including dimethylacetamide solution was added thereto and agitated for more than 8 hours to provide a mixture. Herein, the added amount of NAFION was 20 parts by weight based on 100 parts by weight of dimethylacetamide, and the filler was added at 5 parts by weight based on 100 parts by weight of solid NAFION.

The mixture was casted on a glass plate to produce a final thickness of 100 μm and dried, and then it was treated in a 1M sulfuric acid aqueous solution for 1 hour and washed with distilled water more than four times and dried to provide a polymer electrolyte membrane for a fuel cell.

Example 2

Cross-linked polystyrene polymer particles having an average particle of 50 nm were prepared by emulsion polymerization. The polystyrene polymer particles were refluxed in a toluene solvent with sulfone for 24 hours. Subsequently, the resultant product was immersed in methanol and washed with water twice to provide a filler including a cross-linked hydrophilically surface-treated polymer.

A polymer electrolyte membrane for a fuel cell was fabricated in accordance with the same procedure as in Example 1.

Polymer electrolyte membranes according to Examples 1 and 2 were compared regarding physical properties with the commercially available NAFION electrolyte membrane having the same thickness (100 μm) as that of Examples 1 and 2, which is Comparative Example 1. Mechanical properties such as tensile strength and modulus were measured with a measuring device from Instron Corporation.

Swelling was determined by measuring both the area of the sample of the polymer electrolyte membrane that was dried in a vacuum dryer at 80° C. and the area thereof after immersing the same into distilled water at room temperature for 24 hours.

Swelling(%)=(area of dried sample after immersion)/(area of dried sample)×100

Further, the conductivity was measured at room temperature.

The properties are shown in the following Table 1.

TABLE 1

| | Conductivity (S/cm) | Swelling (%) | Tensile strength (MPa) | Modulus (MPa) |
|---|---|---|---|---|
| Example 1 | 0.10 | 28 | 62 | 421 |
| Example 2 | 0.11 | 23 | 56 | 388 |
| Comparative Example 1 | 0.09 | 20 | 39 | 240 |

As shown in Table 1, polymer electrolyte membranes according to Examples 1 and 2 had higher conductivity and decreased swelling levels as well as the tensile strength and modulus than those of Comparative Example 1.

The polymer electrolyte membrane can improve fuel cell performance due to reduced swelling and excellent mechanical strength.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer electrolyte membrane for a fuel cell, comprising:
    a filler comprising:
        a core comprised of a cross-linked polymer particle; and
        at least one of (i) a hydrophilic functional group bound to a surface of the cross-linked polymer particle to make the surface more hydrophilic than the core, and (ii) a shell comprised of a hydrophilic polymer disposed on the surface of the core; and
    a proton conductive polymer that is different from the hydrophilic polymer disposed on the surface of the core.

2. The polymer electrolyte membrane of claim 1, wherein the cross-linked polymer comprises at least one selected from the group consisting of polystyrene, polysulfone, polyvinylpyridine, —$(CH_2CHC_6H_4SO_3H)_n$— wherein n ranges from 10 to 10,000, and copolymers thereof.

3. The polymer electrolyte membrane of claim 1, wherein the filler has the hydrophilic functional group at its surface.

4. The polymer electrolyte membrane of claim 1, wherein the filler comprises the core comprising the cross-linked polymer and the shell comprising the hydrophilic polymer disposed on the surface of the core.

5. The polymer electrolyte membrane of claim 1, wherein the filler has an average particle diameter ranging from 5 nm to 50 μm.

6. The polymer electrolyte membrane of claim 5, wherein the filler has an average particle diameter ranging from 10 nm to 10 μm.

7. The polymer electrolyte membrane of claim 1, wherein the filler is included in an amount of 0.1 to 50 wt % based on the total weight of the polymer electrolyte membrane.

8. The polymer electrolyte membrane of claim 7, wherein the filler is included in an amount of 1 to 10 wt % based on the total weight of the polymer electrolyte membrane.

9. The polymer electrolyte membrane of claim 1, wherein the proton conductive polymer has a cation exchange group selected from the group consisting of a sulfonic acid group, a carboxylic acid group, a phosphoric acid group, a phosphonic acid group, and derivatives thereof, at its side chain.

10. The polymer electrolyte membrane of claim 9, wherein the proton conductive polymer is at least one selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof.

11. A membrane-electrode assembly for a fuel cell, comprising an anode and a cathode facing each other and the polymer electrolyte membrane of claim 1 interposed between the anode and the cathode.

12. A polymer electrolyte membrane for a fuel cell, comprising:
a filler comprising a cross-linked polymer particle comprising at least one selected from the group consisting of polystyrene, polysulfone, polyvinylpyridine, —$(CH_2CHC_6H_4SO_3H)_n$— wherein n ranges from 10 to 10,000, and copolymers thereof, the cross-linked polymer having at least one of a hydrophilic functional group at its surface to make the surface more hydrophilic than a core and a shell comprised of a hydrophilic polymer disposed on the cross-linked polymer; and
a proton conductive polymer that is different from the hydrophilic polymer disposed on the surface of the core.

13. The polymer electrolyte membrane of claim 12, wherein the filler has an average particle diameter ranging from 5 nm to 50 μm.

14. The polymer electrolyte membrane of claim 12, wherein the filler is included in an amount of 0.1 to 50 wt % based on the total weight of the polymer electrolyte membrane.

15. The polymer electrolyte membrane of claim 12, wherein the cross-linked polymer has the hydrophilic functional group selected from the group consisting of —$(CH_2)_4SO_3H$, —$CF_2CF_2SO_3H$, or a sulfone imide bound to its surface.

16. The polymer electrolyte membrane of claim 12, wherein the cross-linked polymer having the shell comprised of polyvinyl alcohol.

17. The polymer electrolyte membrane of claim 12, wherein the cross-linked polymer particle comprises spherical cross-linked polystyrene polymer having at least one of —$(CH_2)_4SO_3H$, —$CF_2CF_2SO_3H$, and a sulfone imide bound to its surface, and the proton conductive polymer comprises poly(perfluorosulfonic acid).

18. The polymer electrolyte membrane of claim 12, wherein the cross-linked polymer particle comprises cross-linked polystyrene polymer having a surface treated by sultone.

19. A fuel cell system comprising:
at least one electricity generating element, comprising:
a membrane-electrode assembly comprising:
an anode;
a cathode facing the anode; and
a polymer electrolyte membrane interposed between the anode and cathode, the polymer electrolyte membrane comprising a filler comprised of a core comprised of a cross-linked polymer particle and at least one of (i) a hydrophilic functional group bound to a surface of the cross-linked polymer particle to make the surface more hydrophilic than the core, and (ii) a shell comprised of a hydrophilic polymer disposed on the surface of the core and a proton conductive polymer that is different from the hydrophilic polymer disposed on the surface of the core; and
separators disposed on each side of the membrane-electrode assembly;
a fuel supplier supplying the electricity generating element with fuel; and
an oxidant supplier supplying the electricity generating element with an oxidant.

20. The fuel cell system of claim 19, wherein the cross-linked polymer comprises at least one selected from the group consisting of polystyrene, polysulfone, polyvinylpyridine, —$(CH_2CHC_6H_4SO_3H)_n$— wherein n ranges from 10 to 10,000, and copolymers thereof.

21. The fuel cell system of claim 19, wherein the filler comprises the hydrophilic functional group at its surface.

22. The fuel cell system of claim 19, wherein the filler has an average particle diameter ranging from 5 nm to 50 μm.

23. The fuel cell system of claim 19, wherein the filler is included in an amount of 0.1 to 50 wt % based on the total weight of the polymer electrolyte membrane.

24. The fuel cell system of claim 19, which is a direct oxidation fuel cell system.

* * * * *